(12) United States Patent
Sakai

(10) Patent No.: US 8,040,089 B2
(45) Date of Patent: Oct. 18, 2011

(54) DRIVE DEVICE FOR SYNCHRONOUS ELECTRIC MOTOR

(75) Inventor: Kouji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 406 days.

(21) Appl. No.: 12/385,632

(22) Filed: Apr. 14, 2009

(65) Prior Publication Data

US 2009/0256506 A1  Oct. 15, 2009

(30) Foreign Application Priority Data

Apr. 15, 2008  (JP) ................. 2008-105874

(51) Int. Cl.
 *H02P 6/10* (2006.01)
(52) U.S. Cl. ......... 318/400.09; 318/400.03; 318/400.27; 318/400.32
(58) Field of Classification Search .................. 318/139, 318/519, 400.02, 400.03, 400.09, 400.17, 318/400.32, 400.27
 See application file for complete search history.

(56) References Cited

U.S. PATENT DOCUMENTS

| | | | |
|---|---|---|---|
| 6,137,704 A | 10/2000 | Ito et al. | |
| 6,320,775 B1 | 11/2001 | Ito et al. | |
| 6,548,984 B2 * | 4/2003 | Shamoto et al. | 318/801 |
| 7,816,805 B2 * | 10/2010 | Tanaka et al. | 307/10.1 |
| 2002/0000784 A1 * | 1/2002 | Shamoto et al. | 318/801 |
| 2002/0070715 A1 * | 6/2002 | Sasaki et al. | 322/28 |
| 2004/0207360 A1 | 10/2004 | Matsushiro et al. | |
| 2007/0296357 A1 * | 12/2007 | Song et al. | 318/139 |
| 2008/0180055 A1 * | 7/2008 | Zargari et al. | 318/729 |
| 2008/0278102 A1 * | 11/2008 | Taniguchi | 318/400.27 |
| 2009/0096394 A1 * | 4/2009 | Taniguchi | 318/400.09 |
| 2009/0128069 A1 * | 5/2009 | Kaneko et al. | 318/400.09 |
| 2009/0128076 A1 * | 5/2009 | Taniguchi | 318/400.41 |
| 2009/0134700 A1 * | 5/2009 | Tanaka et al. | 307/10.6 |
| 2009/0160376 A1 * | 6/2009 | Yamada | 318/400.02 |
| 2009/0160377 A1 * | 6/2009 | Yamada | 318/400.02 |
| 2009/0237020 A1 * | 9/2009 | Sakai | 318/400.11 |
| 2010/0026220 A1 * | 2/2010 | Sakai | 318/400.17 |
| 2010/0214809 A1 * | 8/2010 | Iwashita et al. | 363/127 |
| 2010/0231153 A1 * | 9/2010 | Sakai | 318/400.32 |
| 2010/0320945 A1 * | 12/2010 | Taniguchi et al. | 318/400.02 |
| 2011/0031922 A1 * | 2/2011 | Sakai et al. | 318/519 |
| 2011/0074326 A1 * | 3/2011 | Su | 318/400.27 |

FOREIGN PATENT DOCUMENTS

JP  A-2002-272183  9/2002
JP  A-2002-291256  10/2002

OTHER PUBLICATIONS

Office Action dated Jan. 19, 2010 issued from the Japan Patent Office in the corresponding patent application No. 2008-105874 (and English translation).

* cited by examiner

*Primary Examiner* — Paul Ip
(74) *Attorney, Agent, or Firm* — Posz Law Group, PLC

(57) ABSTRACT

Switching elements are driven by a control signal outputted from a control circuit, so that a rotating magnetic field is generated from a stator coil to rotate a rotor of a synchronous electric motor. The control signal is generated through use of a selected modulation scheme, which is selected from a plurality of modulation schemes. The control circuit determines which one of the modulation schemes is used as the selected modulation scheme based on a sensed voltage value of a voltage sensor, which senses an output voltage of a power supply device.

18 Claims, 6 Drawing Sheets

DRIVE DEVICE FOR SYNCHRONOUS ELECTRIC MOTOR

CROSS REFERENCE TO RELATED APPLICATION

This application is based on and incorporates herein by reference Japanese Patent Application No. 2008-105874 filed on Apr. 15, 2008.

BACKGROUND OF THE INVENTION

1. Field of the Invention

The present invention relates to a drive device for a synchronous electric motor, in which windings of a stator coil are connected together to form a star connection.

2. Description of Related Art

For example, Japanese Patent 3223842 (corresponding to U.S. Pat. No. 6,320,775) discloses a drive device, which includes an inverter circuit and a control circuit. The inverter circuit includes six transistors (i.e., three upper arm transistors located adjacent to a cathode bus bar and three lower arm transistors located adjacent to an anode bus bar) and six diodes (i.e., three upper arm diodes located adjacent to the cathode bus bar and three lower arm diodes located adjacent to the anode bus bar). The control circuit controls the inverter circuit.

Specifically, a direct current (DC) power supply device is connected between a neutral point of the stator coil and the anode bus bar. A capacitor is connected between the anode bus bar the cathode bus bar.

The control circuit executes a switching operation of the six transistors, so that three-phase alternate currents are supplied to a three-phase alternate current synchronous electric motor (hereinafter, simply referred to as a three-phase AC synchronous motor) in response to a voltage difference between the cathode bus bar and the anode bus bar.

Here, when one of the lower arm transistors is turned on, the corresponding current flows to the stator coil, so that the magnetic energy is accumulated in the stator coil in response to the current.

When the lower arm transistor is turned off, the corresponding current flows from the stator coil to the capacitor through the corresponding upper arm diode and the cathode bus bar. Therefore, when the switching operation of the six transistors is executed, the three-phase alternate currents are supplied to the stator coil, and the electric charge is accumulated in the capacitor. In this way, the electric charge can be accumulated in the capacitor while controlling the operation of the three-phase AC synchronous motor.

In the case of the above drive device for the three-phase AC synchronous motor, when the output voltage of the power supply device is reduced due to, for example, environmental changes or load changes, the voltage difference between the cathode bus bar and the anode bus bar becomes small. When this happens, the operation of the three-phase AC synchronous electric motor becomes unstable, or the three-phase AC synchronous motor cannot be driven due to the output voltage shortage.

In view of the above disadvantage, it is conceivable to obtain the required voltage difference between the cathode bus bar and the anode bus bar by executing the switching operation of the lower arm transistors to accumulate the electric charge in the capacitor in response to the magnetic energy accumulated in the stator coil in the stop state where the control operation of the three-phase AC synchronous motor is stopped. However, in such a case, at the time of controlling the three-phase AC synchronous motor, the time period for executing the switching operation of the transistors may possibly be shortened.

SUMMARY OF THE INVENTION

The present invention addresses the above disadvantage. According to the present invention, there is provided a drive device for a synchronous electric motor that includes a stator coil having a plurality of windings, which are connected together to form a star connection and generate a rotating magnetic field upon energization thereof with electric current supplied from a power supply device to rotate a rotor of the synchronous electric motor. The drive device includes an inverter circuit, a capacitor, a control means, a power supply state sensing means and a deciding means. The inverter circuit includes a plurality of arm pairs, which are connected in parallel between a cathode bus bar and an anode bus bar. Each of the plurality of arm pairs is adapted to connect with a corresponding one of the plurality of windings and includes an upper arm and a lower arm, which are connected in series between the cathode bus bar and the anode bus bar and have an upper arm switching element and a lower arm switching element, respectively. The capacitor is connected to the inverter circuit. The control means is for executing a switching operation of the upper arm switching elements and the lower arm switching elements of the plurality of arm pairs by obtaining and supplying a control signal to each corresponding one of the upper arm switching elements and the lower arm switching elements of the plurality of arm pairs through use of a selected modulation scheme that is selected from a plurality of modulation schemes, each of which is set to charge the capacitor with a corresponding charge amount that differs from that of any other one of the plurality of modulation schemes, so that the rotating magnetic flied is generated at the stator coil according to an output state of the capacitor and an output state of the power supply device. The capacitor is charged with the electric current, which flows from the stator coil to the capacitor while bypassing each corresponding one of the upper arm switching elements and the lower arm switching elements of the plurality of arm pairs upon the execution of the switching operation of the upper arm switching elements and the lower arm switching elements of the plurality of arm pairs by the control means. The power supply state sensing means is for sensing the output state of the power supply device. The deciding means is for deciding which one of the plurality of the modulation schemes is used as the selected modulation scheme based on a sensed value of the power supply state sensing means. The charge amount of the capacitor is adjusted according to the output state of the power supply device upon the execution of the switching operation of the upper arm switching elements and the lower arm switching elements of the plurality of arm pairs by the control means according to the control signal obtained with the selected modulation scheme.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
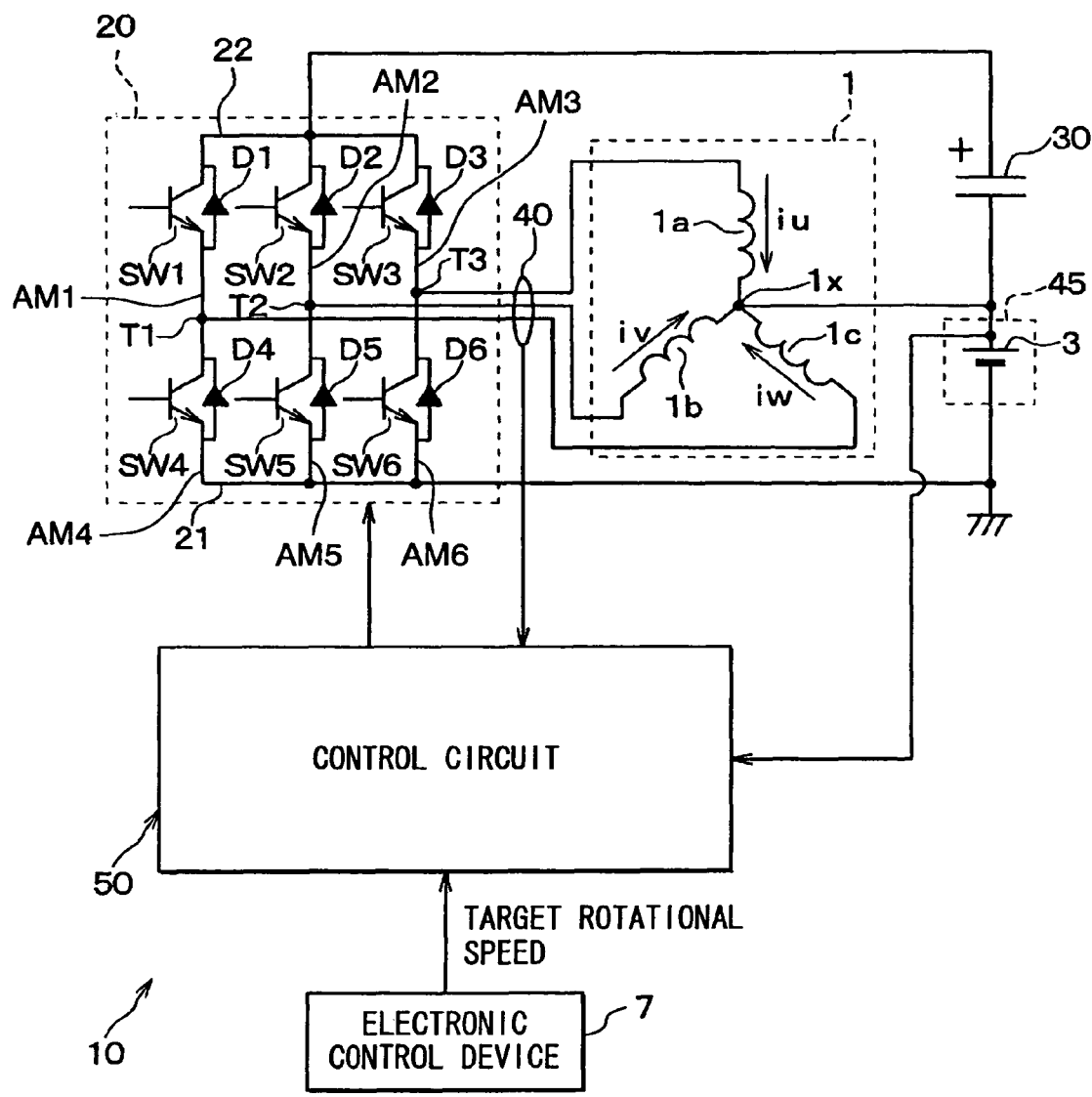
FIG. 1 is a diagram showing a drive device for a three-phase AC synchronous electric motor according to a first embodiment of the present invention.

FIG. 1 shows a three-phase AC synchronous motor according to a first embodiment of the present invention. More specifically, FIG. 1 shows a circuit structure of a drive device and a portion of the three-phase AC synchronous motor.

The drive device 10 generates the three-phase alternate currents based on the direct current voltage and outputs the thus generated three-phase alternate currents to the three-phase AC synchronous motor to drive the same. A load (e.g., a compressor mechanism) is connected to an output shaft of the three-phase AC synchronous motor.

The three-phase AC synchronous motor includes a rotor (not shown) and a stator coil 1. Permanent magnets are provided to the rotor, and the stator coil 1 applies a rotating magnetic field to the rotor. The stator coil 1 includes three-phase windings, i.e., a U-phase winding 1a, a V-phase winding 1b and a W-phase winding 1c, which form a star connection and has a neutral point 1x at a center connection point where the windings 1a, 1b, 1c are connected together. A power supply device (a vehicle battery in this instance) 3 is placed between the neutral point 1x of the stator coil 1 and the ground.

In the present embodiment, the structure of the three-phase AC synchronous motor does not allow installation of a sensor, which senses a rotational position (positional information) of the rotor, into the three-phase AC synchronous motor.

The drive device 10 includes an inverter circuit 20, a capacitor 30, a current sensor 40, a voltage sensor (serving as a power supply state sensing means) 45 and a control circuit 50. The inverter circuit 20 generates the three-phase alternate currents based on an output voltage of the power supply device 3 and a voltage difference between a positive electrode and a negative electrode of the capacitor 30 and outputs the thus generated three-phase alternate currents to the stator coil 1.

The inverter circuit 20 includes a plurality of switching elements (three upper arm switching elements and three lower arm switching elements in this instance) SW1-SW6 and a plurality of diodes (three upper arm diodes and three lower arm diodes in this instance) D1-D6. More specifically, the inverter circuit 20 includes a plurality of arm pairs, which are connected in parallel between a cathode bus bar 22 and an anode bus bar 21. Each of the arm pairs is adapted to connect with a corresponding one of the windings 1a, 1b, 1c and includes an upper arm AM1-AM3 and a lower arm AM4-AM6, which are connected in series between the cathode bus bar 22 and the anode bus bar 21. Furthermore, each upper arm AM1-AM3 is provided with the corresponding upper arm switching element (also referred to as a cathode bus bar 22 side switching element) SW1-SW3 and the corresponding upper arm diode D1-D3, and each lower arm AM4-AM6 is provided with the corresponding lower arm switching element (also referred to as an anode bus bar 21 side switching element) SW4-SW6 and the corresponding lower arm diode D4-D6.

The switching elements SW1, SW4 of the first arm pair (i.e., the upper and lower arms AM1, AM4) are connected in series between the anode bus bar 21 and the cathode bus bar 22. The switching elements SW2, SW5 of the second arm pair (i.e., the upper and lower arms AM2, AM5) are connected in series between the anode bus bar 21 and the cathode bus bar 22. The switching elements SW3, SW6 of the third arm pair (i.e., the upper and lower arms AM3, AM6) are connected in series between the anode bus bar 21 and the cathode bus bar 22. The anode bus bar 21 is connected to the ground.

A common connection T1 between the switching element SW1 and the switching element SW4, i.e., between the upper arm AM1 and the lower arm AM4 is connected to the W-phase winding 1c. A common connection T2 between the switching element SW2 and the switching element SW5, i.e., between the upper arm AM2 and the lower arm AM5 is connected to the V-phase winding 1b. A common connection T3 between the switching element SW3 and the switching element SW6, i.e., between the upper arm AM3 and the lower arm AM6 is connected to the U-phase winding 1a.

The switching elements SW1-SW6 may be semiconductor switching elements, such as insulated gate bipolar transistors, field-effect transistors or the like.

Each of the diodes D1-D6 is connected to a corresponding one of the switching elements SW1-SW6 to form an anti-parallel connection therewith.

The capacitor 30 cooperates with the power supply device 3 to apply an output voltage to the inverter circuit 20. The positive electrode of the capacitor 30 is connected to the cathode bus bar 22 of the inverter circuit 20. The negative electrode of the capacitor 30 is connected to the neutral point 1x of the stator coil 1.

The current sensor 40 senses each of an U-phase current iu, a V-phase current iv and a W-phase current iw. The U-phase current iu is the current, which flows from the common connection T3 between the switching element SW3 and the switching element SW6 to the U-phase winding 1a. The V-phase current iv is the current, which flows from the common connection T2 between the switching element SW2 and the switching element SW5 to the V-phase winding 1b. The W-phase current iw is the current, which flows from the common connection T1 between the switching element SW1 and the switching element SW4 to the W-phase winding 1c.

A direction, which is indicated by an arrow of each of the U-, V- and W-phase currents iu, iv, iw, is a positive side.

The voltage sensor 45 senses the output voltage VB of the power supply device 3.

The control circuit 50 includes a microcomputer, a memory and an analog/digital converter and controls the switching elements SW1-SW6 based on the measured values of the sensors 40, 45 and a target rotational speed received from an electronic control device 7.

Next, an operation according to the present embodiment will be described.

The control circuit 50 outputs a switching signal (serving as a control signal) to the switching elements SW1-SW6. In this way, the switching elements SW1-SW6 perform its corresponding switching operation. Thereby, the three-phase alternate currents are outputted from the common connections T1-T3 to the stator coil 1.

Therefore, the stator coil 1 generates the rotating magnetic field. In this way, the rotor is rotated synchronously with the rotating magnetic field.

Furthermore, electric charge is accumulated in the capacitor 30 upon the switching operation of each of the lower arm switching elements SW4-SW6.

For example, when the switching element SW4 is turned on, the electric current flows from the neutral point 1x side to the ground through the W-phase winding 1c and the switching element SW4. At this time, the magnetic energy is accumulated in the W-phase winding 1c. Thereafter, when the switching element SW4 is turned off, the electric current, which corresponds to the magnetic energy of the W-phase winding 1c, flows to the cathode bus bar 22 side through the diode D1.

That is, when the switching element SW4 is turned off, the electric current flows from the W-phase winding 1c to the cathode bus bar 22 side through the diode D1 in the upper arm AM1 while bypassing the switching element SW1. This electric current flows to the capacitor 30 as the charging current, so that the electric charge is accumulated in the capacitor 30.

Here, at the time of obtaining, i.e., generating the switching signal, the control circuit 50 uses a known technique of triangle-wave generated pulse width modulation (PWM) scheme. Hereinafter, the technique of the triangle-wave generated PWM scheme will be schematically described.

The timing at which the sensed current iu, iv, iw of the current sensor 40 becomes zero is obtained for each of the sensed currents iu, iv, iw. Then, the position of the rotor is estimated based on this timing. Then, the rotational speed (the number of rotations per unit time) of the rotor is estimated based on the estimated position of the rotor. Hereinafter, this estimated rotational speed will be referred to as an estimated rotational speed.

Next, a U-phase command wave, a V-phase command wave and a W-phase command wave, which are used in the triangle-wave generated PWM scheme, are obtained.

Figure 2:
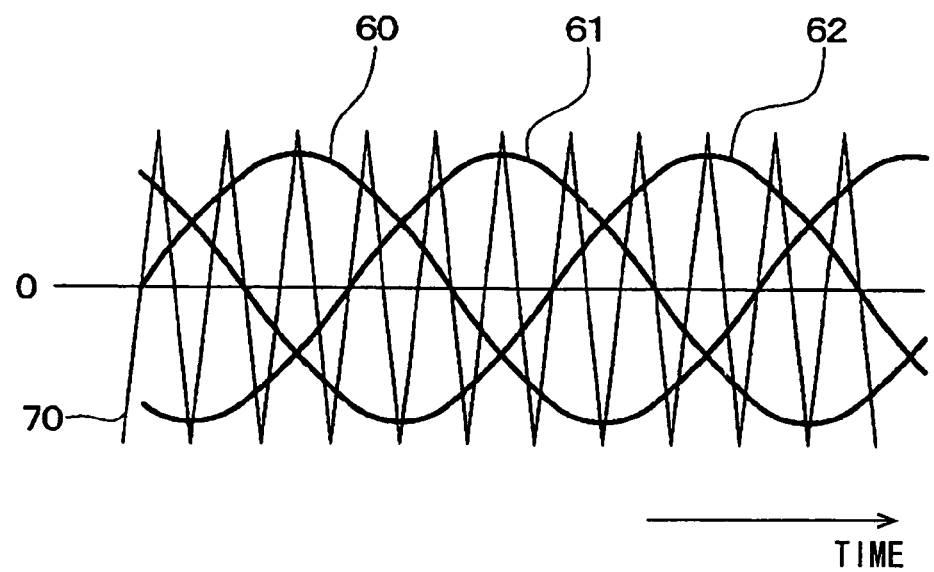
FIG. 2 is a diagram showing a three-phase modulation scheme according to the first embodiment.

FIG. 2 shows an example of the U-phase command wave, the V-phase command wave and the W-phase command wave.

The U-phase command wave 60, the V-phase command wave 61 and the W-phase command wave 62 constitute the three-phase command waves. The U-phase command wave 60, the V-phase command wave 61 and the W-phase command wave 62 are obtained in such a manner that a difference between the target rotational speed of the rotor and the estimated rotational speed of the rotor is minimized.

The three-phase command waves 60-62 are used to determine which one of the upper arm switching element SW1, SW2, SW3 (i.e., the switching element SW1, SW2, SW3 placed on one side of the corresponding common connection T1-T3 where the cathode bus bar 22 is located) and the lower arm switching element SW4, SW5, SW6 (i.e., the switching element SW4, SW5, SW6 placed on the other side of the corresponding common connection T1-T3 where the anode bus bar 21 is located) needs to be turned on for each of the three phases.

The U-phase command wave 60 corresponds to the switching elements SW3, SW6. When the U-phase command wave 60 is larger than a triangle wave (a carrier wave) 70, the upper arm switching element SW3 is turned on, and the lower arm switching element SW6 is turned off. When the U-phase command wave 60 is smaller than the triangle wave 70, the switching element SW3 is turned off, and the switching element SW6 is turned on.

The V-phase command wave 61 corresponds to the switching elements SW2, SW5. When the V-phase command wave 61 is larger than the triangle wave 70, the upper arm switching element SW2 is turned on, and the lower arm switching element SW5 is turned off. When the V-phase command wave 61 is smaller than the triangle wave 70, the switching element SW2 is turned off, and the switching element SW5 is turned on.

The W-phase command wave 62 corresponds to the switching elements SW1, SW4. When the W-phase command wave 62 is larger than the triangle wave 70, the upper arm switching element SW1 is turned on, and the lower arm switching element SW4 is turned off. When the V-phase command wave 61 is smaller than the triangle wave 70, the switching element SW1 is turned off, and the switching element SW4 is turned on.

As described above, it is determined which one of the switching elements SW1-SW6 is turned on. Then, the switching signal, which includes the thus determined information, is obtained.

Here, at the time of obtaining the switching signal, one of three modulation schemes is used. The three modulation schemes are set such that the three-phase command waves 60-62 differ from one scheme to another scheme.

The three modulation schemes include modulation schemes A-C. Here, the modulation scheme A is a first two-phase modulation scheme that makes the charging current to have a small current value. The modulation scheme B is a three-phase modulation scheme that makes the charging current to have an intermediate current value, which is larger than the small current value and is smaller than a large current value described below. The modulation scheme C is a second two-phase modulation scheme that makes the charging current to have the large current value.

In the following description, the modulation schemes A-C will be individually described.

Figure 3:
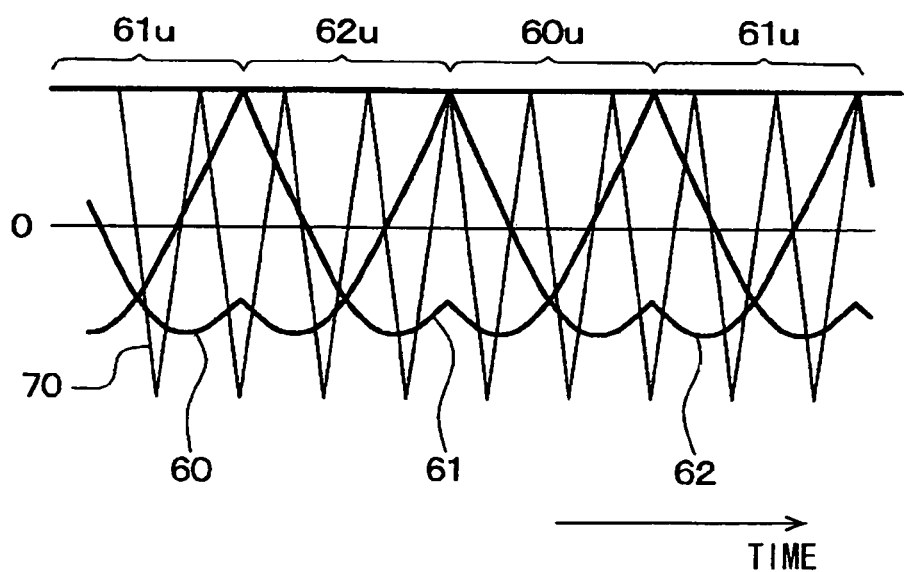
FIG. 3 is a diagram showing a two-phase modulation scheme according to the first embodiment.

FIG. 3 shows the three-phase command waves 60-62 in the case of the modulation scheme A.

A switching stop time interval 60u, during which the switching operation of the corresponding switching elements SW3, SW6 for the command wave 60 is stopped, is set to be a ⅓ period of the command wave 60. A switching stop time interval 61u, during which the switching operation of the corresponding switching elements SW2, SW5 for the command wave 61 is stopped, is set to be ⅓ period of the command wave 61. A switching stop time interval 62u, during which the switching operation of the corresponding switching elements SW1, SW4 for the command wave 62 is stopped, is set to be ⅓ period of the command wave 62.

Thereby, the three-phase command waves 60-62 become larger that the triangle wave 70. Thus, in this modulation scheme, each corresponding time period, during which a corresponding one of the three-phase command waves 60-62 is larger than the triangle wave 70, is longer than that of the modulation scheme B (the three-phase modulation scheme).

Here, in the time period, during which the corresponding one of the three-phase command waves 60-62 is larger than the triangle wave 70, the corresponding upper arm switching element SW1, SW2, SW3 is turned on, and the corresponding lower arm switching element SW4, SW5, SW6 is turned off.

Therefore, an off-time period Toff of each of the lower arm switching elements SW4, SW5, SW6 is shorter than that of the three-phase modulation scheme. Accordingly, in this modulation scheme, an output-to-input voltage ratio (also sometimes referred to as a set-up ratio), which is expressed by (Ton+Toff)/Toff, is smaller than that of the three-phase modulation scheme.

In the modulation scheme B, the three-phase command waves 60, 61, 62 form sine waves, respectively, as shown in FIG. 2.

Figure 4:
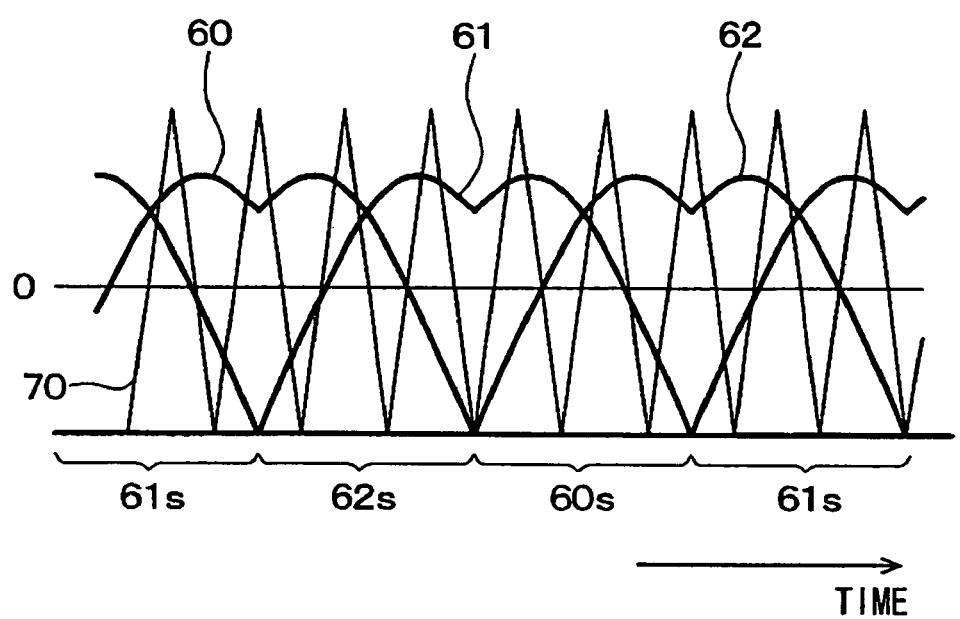
FIG. 4 is a diagram showing another two-phase modulation scheme according to the first embodiment.

FIG. 4 shows the three-phase command waves 60-62 in the case of the modulation scheme C.

A switching stop time interval 60s, during which the switching operation of the corresponding switching elements SW3, SW6 for the command wave 60 is stopped, is set to be a ⅓ period of the command wave 60. A switching stop time interval 61s, during which the switching operation of the corresponding switching elements SW2, SW5 for the command wave 61 is stopped, is set to be ⅓ period of the command wave 61. A switching stop time interval 62s, during which the switching operation of the corresponding switching elements SW1, SW4 for the command wave 62 is stopped, is set to be ⅓ period of the command wave 62.

Thereby, the three-phase command waves 60-62 become smaller than that of the triangle wave 70. Thus, in this modulation scheme, each corresponding time period, during which a corresponding one of the three-phase command waves 60-62 is larger than the triangle wave 70, is shorter than that of the modulation scheme B (three-phase modulation scheme).

Here, in the corresponding time period, during which the corresponding one of the three-phase command waves 60-62 is smaller than the triangle wave 70, the corresponding upper arm switching element SW1, SW2, SW3 is turned off, and the corresponding lower arm switching element SW4, SW5, SW6 is turned on.

Therefore, an on-time period Ton of each of the lower arm switching elements SW4, SW5, SW6 is longer than that of the modulation scheme B (the three-phase modulation scheme).

Therefore, in this modulation scheme, the output-to-input voltage ratio, which is the ratio between the on-time period Ton and the off-time period Toff and is expressed by (Ton+Toff)/Toff, is longer than the output-to-input voltage ratio (=about 2) of the three-phase modulation scheme. Here, as recited above, the off-time period Toff of the above expression is the off-time period of the corresponding lower arm switching element SW4, SW5, SW6.

As described above, the three types of the modulation schemes are set to have different output-to-input voltage ratios, respectively. Here, when the output-to-input voltage ratio is increased, the current value of the charging current is increased. Therefore, when the output-to-input voltage ratio is increased, the amount of the electric charge accumulated in the capacitor 30 is increased.

The control circuit 50 determines which one of the three types of the modulation schemes is used based on the output voltage (hereinafter, referred to as the supply voltage) of the power supply device 3 and controls the rotational speed of the three-phase AC synchronous motor.

Next, the control operation for controlling the rotational speed of the three-phase AC synchronous motor will be described more specifically.

Figure 5:
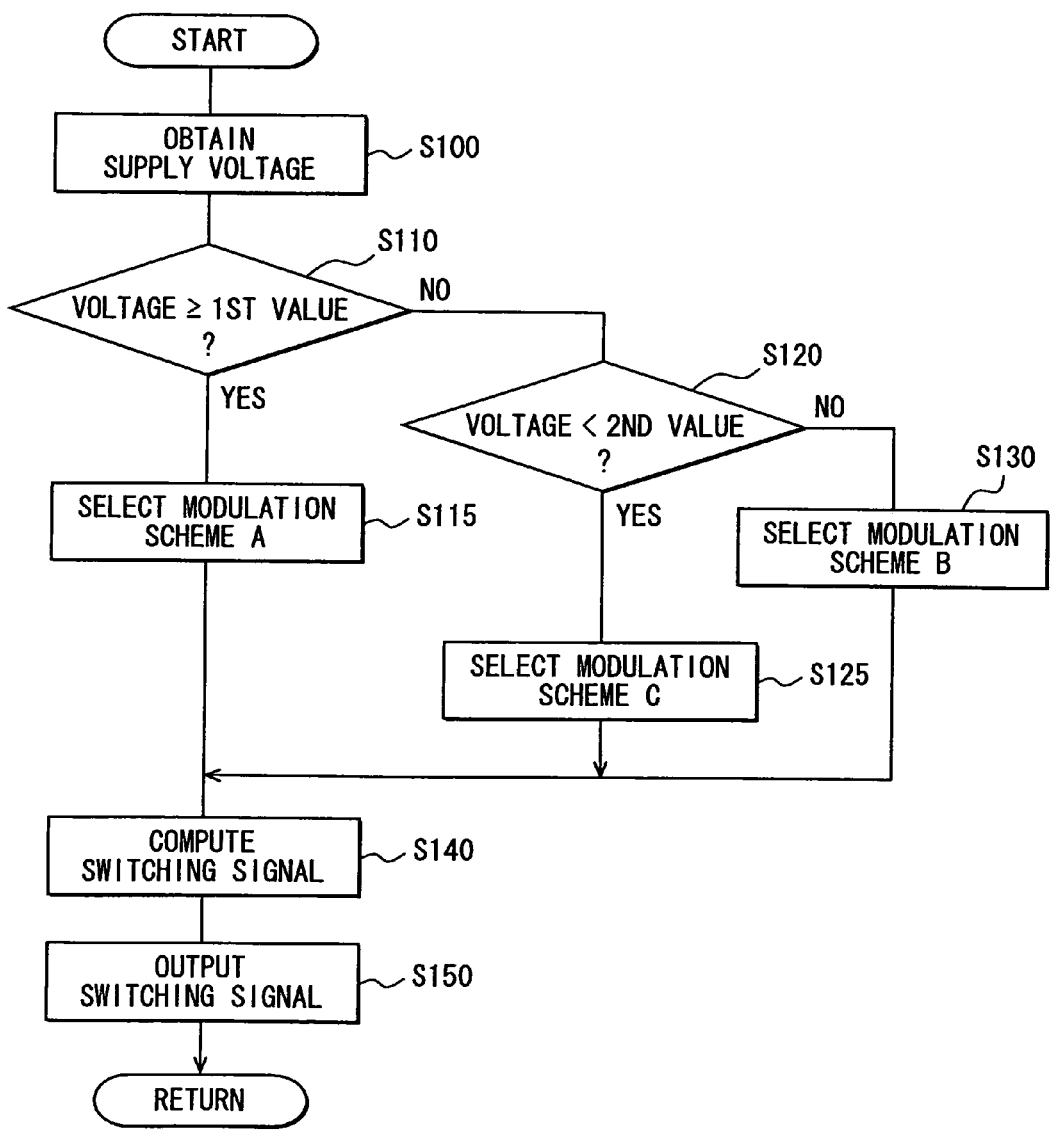
FIG. 5 is a flowchart showing a control operation of a control circuit shown in FIG. 1.

FIG. 5 is a flowchart showing the motor control operation of the control circuit 50.

First, the electronic control device 7 commands the control circuit 50 to start the control operation. Then, the control circuit 50 starts execution of a corresponding computer program in consistent with the flowchart of FIG. 5 based on the command for starting the control operation from the electronic control device 7.

First, at step S100, the supply voltage, which is the output voltage of the power supply device 3 provided to the stator coil 1 and is sensed with the voltage sensor 45, is obtained from the voltage sensor 45.

Then, at step S110, it is determined whether the supply voltage is equal to or higher than a first preset value. When it is determined that the supply voltage is equal to or higher than the first preset value at step S110 (i.e., YES at step S110), the operation proceeds to step S115. At step S115, the modulation scheme A is determined to be a selected modulation scheme, which is selected and is used to control the rotational speed of the three-phase AC synchronous motor. The modulation scheme A serves as a fourth or fifth modulation scheme of the present invention.

Alternatively, when it is determined that the supply voltage is less than the first preset value at step S110 (i.e., NO at step S110), the operation proceeds to step S120. At step S120, it is determined whether the supply voltage is less than a second preset value. The second preset value is a voltage value, which is lower than the first preset value.

When it is determined that the supply voltage is less than the second preset value at step S120 (i.e., YES at step S120), the operation proceeds to step S125. At step S125, the modulation scheme C is determined to be the selected modulation scheme, which is selected and is used to control the rotational speed of the three-phase AC synchronous motor. The modulation scheme C serves as a second or seventh modulation scheme of the present invention.

Furthermore, in a case where the supply voltage is less than the first preset value and is equal to or higher than the second preset value, NO is returned at step S120. Then, the operation proceeds to step S130. At step S130, the modulation scheme B is determined to be the selected modulation scheme, which is selected and is used to control the rotational speed of the three-phase AC synchronous motor. The modulation scheme B serves as a first, third or sixth modulation scheme of the present invention.

As described above, the modulation scheme, which is selected and is used to control the rotational speed of the three-phase AC synchronous motor, is determined in the above described manner. Then, the operation proceeds to step S140 where the switching signal is obtained by using the above-determined modulation scheme. Next, the operation proceeds to step S150. At step S150, the obtained switching signal is outputted to the switching elements SW1-SW6.

Thereafter, the operation returns to step S100. At step S100, the supply voltage, which is sensed with the voltage sensor 45, is obtained from the voltage sensor 45 once again. Then, the degree of the supply voltage V is identified at step 110 or step 120, as discussed above. Thereafter, the modulation scheme, which is selected and is used to control the rotational speed of the three-phase AC synchronous motor, is determined based on the supply voltage V at the corresponding one of steps S115, S125, S130 in the above described manner.

Then, the operation proceeds to step S140 where the corresponding switching signal is obtained by using the above-determined modulation scheme. Then, the operation proceeds to step S150. At step S150, the obtained switching signal is outputted to the switching elements SW1-SW6.

Thereafter, steps S100-S150 are repeated. Thereby, the three-phase alternate currents are outputted from the common connections T1-T3 to the windings 1a-1c of the stator coil 1. Therefore, the rotating magnetic field, which is in consistent with the three-phase command waves 60-62, is generated from the stator coil 1. Thereby, the rotor is rotated synchronously with the rotating magnetic field.

Furthermore, as discussed above, in the present embodiment, the modulation scheme, which is used to control the rotational speed of the three-phase AC synchronous motor, is determined based on the supply voltage.

Specifically, in the case where the supply voltage is less than the first preset value and is equal to or higher than the second preset value, the modulation scheme B is selected. Furthermore, in the case where the supply voltage is equal to or higher than the first preset value, the modulation scheme A, which makes the output-to-input voltage ratio to be smaller than the output-to-input voltage ratio of the modulation scheme B, is selected. In addition, in the case where the supply voltage is less than the second preset value, the modulation scheme C, which makes the output-to-input voltage ratio to be larger than the output-to-input voltage ratio of the modulation scheme B, is selected.

In this way, the amount of electric charge, which is accumulated in the capacitor 30, is adjusted. Therefore, when steps S100-S150 are repeated, the supply voltage is held in the range between the first preset value and the second preset value.

In the present embodiment described above, the control circuit 50 drives the stator coil 1 to generate the rotating magnetic field, which corresponds to the three-phase command waves 60-62 by using the triangle-wave generated PWM scheme. Therefore, the rotor is rotated according to the three-phase command waves 60-62.

Furthermore, as discussed above, in the present embodiment, the modulation scheme, which is selected and is used to control the rotational speed of the three-phase AC synchronous motor, is determined based on the supply voltage. Thus, the amount of electric charge, which is accumulated in the capacitor 30, is adjusted.

The control circuit 50 controls the rotation of the rotor of the three-phase AC synchronous motor in consistent with the three-phase command waves 60, 61, 62, so that the amount of charge (the charge amount of the capacitor 30), which is accumulated in the capacitor 30, is adjusted. Therefore, it is possible to adjust the charge amount of the capacitor 30 according to the output voltage of the power supply device 3 while limiting the reduction in the time period for executing the switching operation of the switching elements SW1-SW6 at the time of controlling the three-phase AC synchronous motor.

Second Embodiment

In the first embodiment, when the power supply voltage is in the range between the first preset value and the second preset value, the three-phase modulation scheme is used to control the rotational speed of the AC synchronous motor. In place of this, according to the present embodiment, the rotational speed of the AC synchronous motor is controlled in the following manner.

Figure 6:
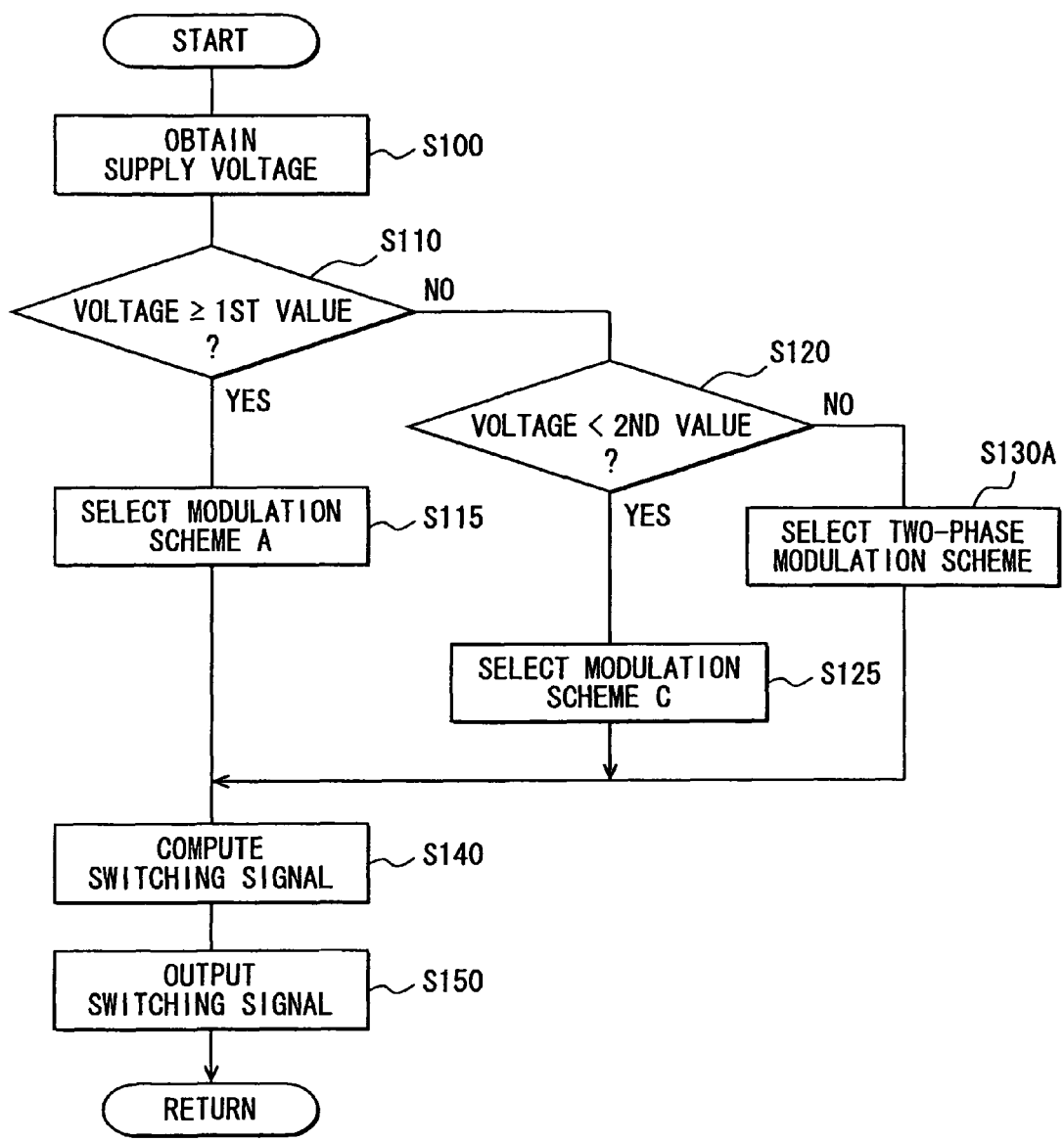
FIG. 6 is a flowchart showing a control operation of a control circuit according to a second embodiment of the present invention.

The control circuit of the present embodiment starts the execution of the corresponding computer program according to the flowchart shown in FIG. 6. In FIG. 6, steps similar to those of FIG. 5 are indicated by the same reference numerals and will not be described again for the sake of simplicity.

Figure 7:
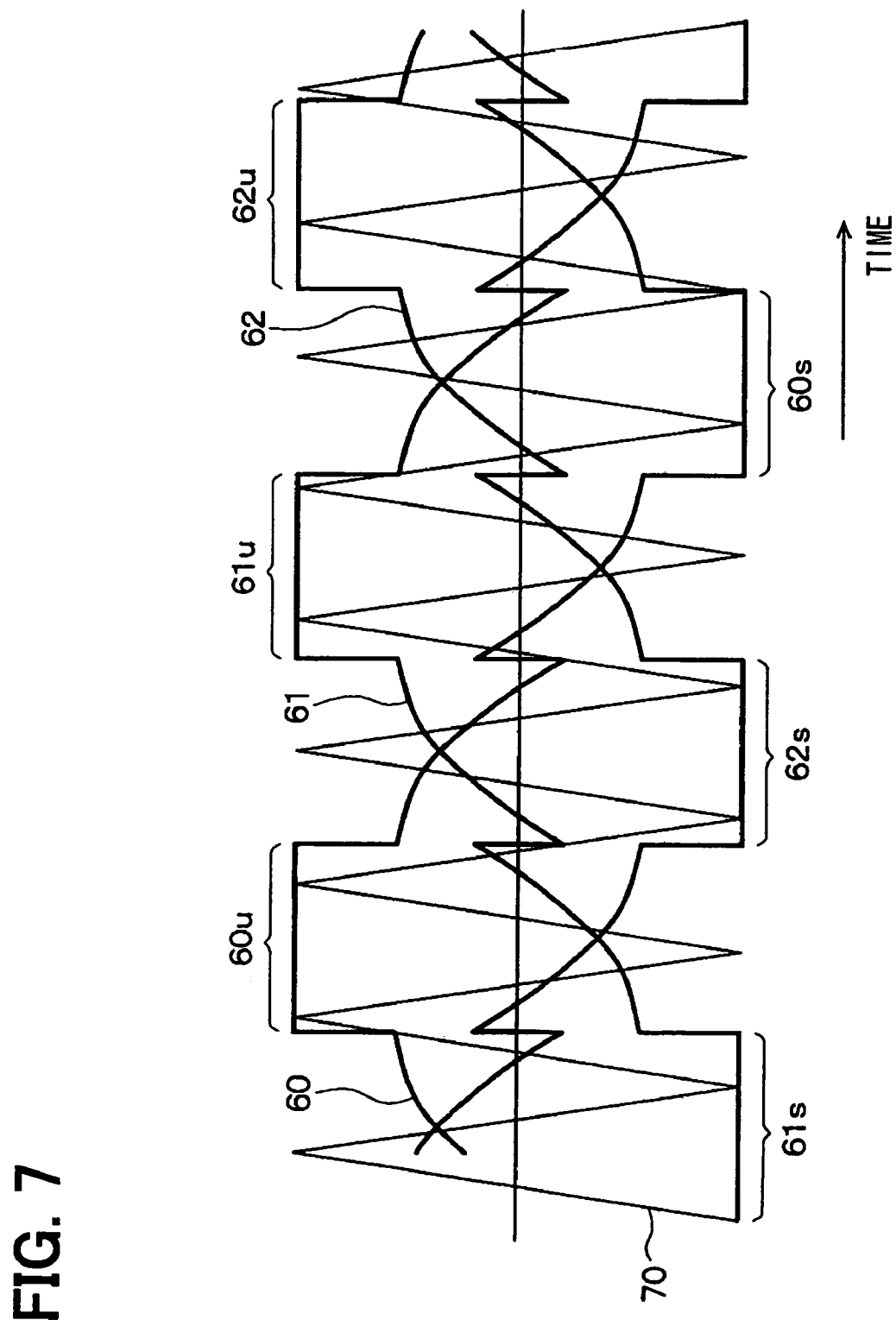
FIG. 7 is a diagram showing a two-phase modulation scheme according to the second embodiment.

When the supply voltage is less than the first preset value and is equal to or larger than the second preset value, the control circuit determines to use a two-phase modulation scheme indicated in FIG. 7 as the selected modulation scheme for controlling the rotational speed of the three-phase AC synchronous motor at step S130A. Then, the control circuit uses this two-phase modulation scheme to obtain the switching signal (serving as the control signal) and to output this switching signal to the switching elements SW1-SW6.

The two-phase modulation scheme indicated in FIG. 7 is a combination of the modulation scheme indicated in FIG. 3 and the modulation scheme indicated in FIG. 4. Specifically, in the two-phase modulation scheme indicated in FIG. 7, the stop time interval 60s and the stop time interval 60u are alternately provided in the command wave 60 at the bottom side and the top side, respectively, in FIG. 7.

Furthermore, the stop time interval 61s and the stop time interval 61u are alternately provided in the command wave 61 at the bottom side and the top side, respectively, in FIG. 7. Furthermore, the stop time interval 62s and the stop time interval 62u are alternately provided in the command wave 62 at the bottom side and the top side, respectively, in FIG. 7.

The stop time intervals are set in the respective command waves 60-62 in the above described manner. Thus, the output-to-input voltage ratio of the two-phase modulation scheme indicated in FIG. 7 becomes the same value (=2) as that of the three-phase modulation scheme shown in FIG. 2.

The two-phase modulation scheme shown in FIG. 7 corresponds to the first, third or sixth modulation scheme of the present invention.

In each of the above embodiments, the capacitor 30 is placed between the neutral point 1x of the stator coil 1 and the cathode bus bar 22. However, the present invention is not limited to this. For instance, the capacitor 30 may be placed between the neutral point 1x of the stator coil 1 and the anode bus bar 21. In such a case, the power supply device 3 may be placed between the neutral point 1x of the stator coil 1 and the cathode bus bar 22. Also, the capacitor 30 may be placed between the cathode bus bar 22 and the anode bus bar 21.

In the first embodiment, when the supply voltage is less than the first preset value and is equal to or higher than the second preset value, the three-phase modulation scheme is used to control the three-phase AC synchronous motor. However, the present invention is not limited to this, and any other appropriate modulation scheme, which is other than the three-phase modulation scheme, may be used to control the three-phase AC synchronous motor.

In each of the above embodiments, the three-phase AC synchronous motor is used as the synchronous motor. However, the present invention is not limited to this. For instance, a multi-phase (four or more phase) alternate current synchronous motor may be used as the synchronous motor of the present invention.

Steps S115, S125, S130, S130A of the above embodiments may serve as a deciding means of the present invention. Steps S140, S150 of the above embodiments may serve as a control means of the present invention. Furthermore, step S120 of the above embodiments may serve as a first determining means or a fourth determining means of the present invention. Also, step S110 of the above embodiments may serve as a second determining means or a third determining means of the present invention. In addition, the second preset value used at step S120 of the above embodiments may serve as a first predetermined value or a fourth predetermined value of the present invention. Here, although the first predetermined value and the fourth predetermined value of the present invention are the same value (the second preset value) in the above embodiments, the first predetermined value and the fourth predetermined value of the present invention may be different from each other, if desired. Furthermore, the first preset value used at step S110 of the above embodiments may serve as a second predetermined value or a third predetermined value of the present invention. Here, although the second predetermined value and the third predetermined value of the present invention are the same value (the first preset value) in the above cases, the second predetermined value and the third predetermined value of the present invention may be different from each other, if desired.

Additional advantages and modifications will readily occur to those skilled in the art. The invention in its broader terms is therefore not limited to the specific details, representative apparatus, and illustrative examples shown and described.

What is claimed is:

1. A drive device for a synchronous electric motor that includes a stator coil having a plurality of windings, which are connected together to form a star connection and generate a rotating magnetic field upon energization thereof with electric current supplied from a power supply device to rotate a rotor of the synchronous electric motor, the drive device comprising:
an inverter circuit that includes a plurality of arm pairs, which are connected in parallel between a cathode bus bar and an anode bus bar, wherein each of the plurality of arm pairs is adapted to connect with a corresponding one of the plurality of windings and includes an upper arm and a lower arm, which are connected in series between the cathode bus bar and the anode bus bar and have an upper arm switching element and a lower arm switching element, respectively;
a capacitor that is connected to the inverter circuit;
a control means for executing a switching operation of the upper arm switching elements and the lower arm switching elements of the plurality of arm pairs by obtaining and supplying a control signal to each corresponding one of the upper arm switching elements and the lower arm switching elements of the plurality of arm pairs through use of a selected modulation scheme that is selected from a plurality of modulation schemes, each of which is set to charge the capacitor with a corresponding charge amount that differs from that of any other one of the plurality of modulation schemes, so that the rotating magnetic flied is generated at the stator coil according to an output state of the capacitor and an output state of the power supply device, wherein the capacitor is charged with the electric current, which flows from the stator coil to the capacitor while bypassing each corresponding one of the upper arm switching elements and the lower arm switching elements of the plurality of arm pairs upon the execution of the switching operation of the upper arm switching elements and the lower arm switching elements of the plurality of arm pairs by the control means;
a power supply state sensing means for sensing the output state of the power supply device; and
a deciding means for deciding which one of the plurality of the modulation schemes is used as the selected modulation scheme based on a sensed value of the power supply state sensing means, wherein the charge amount of the capacitor is adjusted according to the output state of the power supply device upon the execution of the switching operation of the upper arm switching elements and the lower arm switching elements of the plurality of arm pairs by the control means according to the control signal obtained with the selected modulation scheme.

2. The drive device according to claim 1, wherein each of the plurality of modulation schemes is set such that the charge amount of the capacitor is increased when an output-to-input voltage ratio, which indicates a ratio between an on-time period and an off-time period of the lower arm switching element of each corresponding one of the plurality of arm pairs, is increased.

3. The drive device according to claim 2, further comprising a first determining means for determined whether a sensed voltage value, which is the sensed value of the power supply state sensing means, is equal to or larger than a first predetermined value, wherein:
when the first determining means determines that the sensed voltage value is equal to or larger than the first predetermined value, the deciding means decides a first modulation scheme among the plurality of modulation schemes as the selected modulation scheme used by the control means;
when the first determining means determines that the sensed voltage value is less than the first predetermined value, the deciding means decides a second modulation scheme among the plurality of modulation schemes as the selected modulation scheme used by the control means; and
the out-to-input voltage ratio, which is set by the second modulation scheme, is larger than that of the first modulation scheme.

4. The drive device according to claim 3, wherein the control means executes the switching operation of the upper arm switching elements and the lower arm switching elements of the plurality of arm pairs based on a result of comparison of a carrier wave with three-phase command waves to generate the rotating magnetic field from the stator coil of the synchronous electric motor, which is a three-phase synchronous electric motor.

5. The drive device according to claim 4, wherein the first modulation scheme is a three-phase modulation scheme, according to which the three-phase command waves are formed as sine waves, respectively.

6. The drive device according to claim 4, wherein the second modulation scheme is a two-phase modulation scheme, according to which a stop time interval is set to raise the output-to-input voltage ratio in each corresponding one of the three-phase command waves, and the stop time interval is set to be a ⅓ period of the corresponding one of the three-phase command waves.

7. The drive device according to claim 4, wherein the first modulation scheme is a two-phase modulation scheme, according to which a stop time interval, which is set to raise the output-to-input voltage ratio in a corresponding one of the three-phase command waves, and a stop time interval, which is set to lower the output-to-input voltage ratio in the corresponding one of the three-phase command waves, are provided alternately for each of the three-phase command waves.

8. The drive device according to claim 2, further comprising a second determining means for determined whether a sensed voltage value, which is the sensed value of the power supply state sensing means, is less than a second predetermined value, wherein:
when the second determining means determines that the sensed voltage value is less than the second predetermined value, the deciding means decides a third modulation scheme among the plurality of modulation schemes as the selected modulation scheme used by the control means; and
when the second determining means determines that the sensed voltage value is equal to or larger than the second predetermined value, the deciding means decides a fourth modulation scheme among the plurality of modulation schemes as the selected modulation scheme used by the control means; and
the out-to-input voltage ratio, which is set by the fourth modulation scheme, is smaller than that of the third modulation scheme.

9. The drive device according to claim 8, wherein the control means executes the switching operation of the upper arm switching elements and the lower arm switching elements of the plurality of arm pairs based on a result of comparison of a carrier wave with three-phase command waves to generate the rotating magnetic field from the stator coil of the synchronous electric motor, which is a three-phase synchronous electric motor.

10. The drive device according to claim 9, wherein the third modulation scheme is a three-phase modulation scheme, according to which the three-phase command waves are formed as sine waves, respectively.

11. The drive device according to claim 9, wherein the fourth modulation scheme is a two-phase modulation scheme, according to which a stop time interval is set to lower the output-to-input voltage ratio in each corresponding one of the three-phase command waves, and the stop time interval is set to be a ⅓ period of the corresponding one of the three-phase command waves.

12. The drive device according to claim 9, wherein the third modulation scheme is a two-phase modulation scheme, according to which a stop time interval, which is set to raise the output-to-input voltage ratio in a corresponding one of the three-phase command waves, and a stop time interval, which is set to lower the output-to-input voltage ratio in the corresponding one of the three-phase command waves, are provided alternately for each of the three-phase command waves.

13. The drive device according to claim 2, further comprising:
a third determining means for determined whether a sensed voltage value, which is the sensed value of the power supply state sensing means, is equal to or larger than a third predetermined value;
a fourth determining means for determining whether the sensed value is less than the third predetermined value and is equal to or larger than a fourth predetermined value, wherein:
when the third determining means determines that the sensed voltage value is equal to or larger than the third predetermined value, the deciding means decides a fifth modulation scheme among the plurality of modulation schemes as the selected modulation scheme used by the control means;
when the fourth determining means determines that the sensed voltage value is less than the third predetermined value and is equal to or larger than the fourth predetermined value, the deciding means decides a sixth modulation scheme among the plurality of modulation schemes as the selected modulation scheme used by the control means;
the out-to-input voltage ratio, which is set by the sixth modulation scheme, is larger than that of the fifth modulation scheme;
when the fourth determining means determines that the sensed voltage value is less than the fourth predetermined value, the deciding means decides a seventh modulation scheme among the plurality of modulation schemes as the selected modulation scheme used by the control means; and
the out-to-input voltage ratio, which is set by the seventh modulation scheme, is larger than that of the sixth modulation scheme.

14. The drive device according to claim 13, wherein the control means executes the switching operation of the upper arm switching elements and the lower arm switching elements of the plurality of arm pairs based on a result of comparison of a carrier wave with three-phase command waves to generate the rotating magnetic field from the stator coil of the synchronous electric motor, which is a three-phase synchronous electric motor.

15. The drive device according to claim 14, wherein the fifth modulation scheme is a two-phase modulation scheme, according to which a stop time interval is set to lower the output-to-input voltage ratio in each corresponding one of the three-phase command waves, and the stop time interval is set to be a ⅓ period of the corresponding one of the three-phase command waves.

16. The drive device according to claim 14, wherein the sixth modulation scheme is a three-phase modulation scheme, according to which the three-phase command waves are formed as sine waves, respectively.

17. The drive device according to claim 14, wherein the sixth modulation scheme is a two-phase modulation scheme, according to which a stop time interval, which is set to raise the output-to-input voltage ratio in a corresponding one of the three-phase command waves, and a stop time interval, which is set to lower the output-to-input voltage ratio in the corresponding one of the three-phase command waves, are provided alternately for each of the three-phase command waves.

18. The drive device according to claim 14, wherein the seventh modulation scheme is a two-phase modulation scheme, according to which a stop time interval is set to raise the output-to-input voltage ratio in each corresponding one of the three-phase command waves, and the stop time interval is set to be a ⅓ period of the corresponding one of the three-phase command waves.

* * * * *